United States Patent Office 3,338,894
Patented Aug. 29, 1967

3,338,894
PROCESS FOR PREPARING 6-NITROFURYL TRIAZINE DERIVATIVES
Akira Takai, Isamu Saikawa, and Yasuyuki Suzuki, Toyama Prefecture, and Katsumi Tanabe, Yukichi Kishida, and Yoshio Suzuki, Tokyo, Japan, assignors to Toyama Kagaku Kogyo Kabushiki Kaisha, and Sankyo Company, Limited, both of Tokyo, Japan
No Drawing. Filed Apr. 20, 1965, Ser. No. 449,647
Claims priority, application Japan, Apr. 23, 1964, 39/22,648
4 Claims. (Cl. 260—240)

This invention relates to novel 6-nitrofuryl triazine derivatives and a process for preparing the same. More particularly, it relates to novel 3-bis(acyloxymethyl)amino - 6 - [2 - (5 - nitro - 2 - furyl)vinyl] - 1,2,4 - triazines having the formula

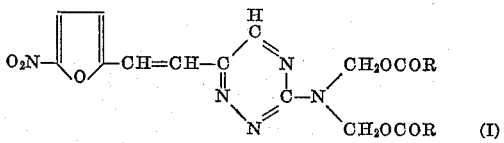

wherein R represents alkyl group containing from 1 to 5 carbon atoms such as methyl, ethyl, n-propyl, i-propyl, n-butyl, i-butyl or pentyl radicals and a process for preparing the same.

The 6-nitrofuryl triazine derivatives having the above Formula I are novel compounds possessing potent antibacterial activities and having excellent stabilities.

A considerable number of 6-nitrofuryl triazine derivatives have already prepared and tested for chemotherapeutic effects thereof. Some of them have practically been applied to the treatment of various types of bacterial infections. More specifically, 3-bis(hydroxymethyl)amino-6-[2-(5-nitro-2-furyl)vinyl]-1,2,4-triazine is known to be an efficient chemotherapeutic agent.

The above-specified triazine derivative has potent antibacterial activity in a living body. However, as apparent from its chemical structure, the above-specified triazine derivative is considered to be unstable under ambient condition such as at elevated temperature, for example, about 40–50° C. and, in fact, it has found that the preparation containing the above-specified triazine derivative sometimes undergoes degradation at elevated temperature, for example, about 40–50° C.

In a view of the above-mentioned disadvantages in the prior art, the appearence of much more efficient and stable 5-nitrofuryl triazine derivatives has earnestly desired.

As a result of numerous investigation, it has now been found that the 6-nitrofuryl triazine derivatives having the above Formula I possess potent antibacterial activities and in particular are very stable under ambient condition without any degradation.

It is therefore an object of this invention to provide novel 6-nitrofuryl triazine derivatives having the above Formula I useful as effective and stable antibacterial agent.

Another object of this invention is the provision of a process for preparing such novel and useful 6-nitrofuryl triazine derivatives having the above Formula I.

These and other objects of this invention will become apparent from the following detailed descriptions.

The 6-nitrofuryl triazine derivatives having the above Formula I may be prepared by subjecting 3-bis(hydroxymethyl) - amino - 6 - [2 - (5 - nitro - 2 - furyl)vinyl]-1,2,4-triazine to acylation with any conventional means.

In the process according to this invention, acylating means which can be employed may be any of the conventional means known to acylate the OH group. Typical examples of acylating agent in the process according to this invention include the anhydrides or halides of lower aliphatic acids, such as acetic, propionic, or butyric anhydrides; or acetyl, propionyl or butyryl chlorides as well as ketene.

In carrying out the process according to this invention, the starting material, 3-bis(hydroxymethyl)amino-6-[2-(5-nitro-2-furyl)vinyl]-1,2,4-triazine, is suspended or dissolved in an inert organic solvent and subsequently a suitable acylating agent is added to the resultant mixture. Alternatively, in the absence of such an inert organic solvent the starting material may be reacted with a suitable acylating agent. The inert organic solvent employed in the process according to this invention may be any of such solvent as employed in the conventional acylation. Examples of the solvent are aromatics, such as benzene and toluene; ethers, such as dioxane and tetrahydrofuran; amides, such as dimethylformamide; ketones, such as methylethylketone and acetone; nitriles such as acetonitrile; and halogenated hydrocarbons, such as ethylene dichloride and tetrachloroethane.

It is desirable that such acylation catalyst as organic bases, for example, pyridine, picoline, dimethylaniline or triethylamine or sodium acetate be present in the reaction and in case of absence of an inert organic solvent these catalysts may serve as reaction medium.

Other reaction conditions, or the reaction temperature and time may be employed those of the conventional acylation, but generally it is preferable to carry out the reaction at room temperature (but, if desired, this may be lowered or raised) for about 1–6 hours, since the exothermic reaction may sometimes take place in the present process.

After completion of the reaction, the desired product may be recovered from the reaction mixture by any of the conventional methods, for example, by removal of the solvent or by dilution with water followed by filtration.

The following compounds are the representative of those contemplated by this invention and which may be prepared by the procedure as described hereinabove:

3-bis(acetoxymethyl)amino-6-[2-(5-nitro-2-furyl)vinyl]-1,2,4-triazine;
3-bis(propionyloxymethyl)amino-6-[2-(5-nitro-2-furyl) vinyl]-1,2,4-triazine;
3-bis(butyryloxymethyl)amino-6-[2-(5-nitro-2-furyl) vinyl]-1,2,4-triazine;
3-bis(isobutyryloxymethyl)amino-6-[2-(5-nitro-2-furyl) vinyl]-1,2,4-triazine;
3-bis(pentanoyloxymethyl)amino-6-[2-(5-nitro-2-furyl) vinyl]-1,2,4-triazine:

The following examples are given only by way of illustration and not by way of limitation of this invention.

EXAMPLE 1

*Preparation of 3-bis(acetoxymethyl)amino-6-[2-(5-nitro-2-furyl)-vinyl]-1,2,4-triazine*

A mixture of 18 g. of 3-bis(hydroxymethyl)amino-6-[2-(5-nitro-2-furyl)vinyl]-1,2,4-triazine, 18 ml. of pyridine and 23.4 ml. of acetic anhydride is stirred at room temperature, thereby the exothermic reaction takes place and the reaction temperature rises gradually. The crystalline material substantially dissolves at 25° C. and thereafter a large amount of the yellow crystalline material separates to obtain slurry. The slurry is maintained at 40–50° C. for 4 hours, diluted with water and then the precipitate thus formed is washed with water to yield 20.3 g. of the crude yellow crystalline material, which is then recrystallized from 160 ml. of toluene to give 16 g. of the desired product as yellow needles melting at 147° C. An additional amount of the desired product, 1.4 g., is recovered from the toluene layer.

EXAMPLE 2

*Preparation of 3-bis(acetoxymethyl)amino-6-[2-(5-nitro-2-furyl)vinyl]-1,2,4-triazine*

The same procedure as in Example 1 is repeated except that 20 ml. of dimethylformamide instead of pyridine and 24 ml. of acetic anhydride are employed, thereby 16.8 g. of the desired product is obtained as yellow needles melting at 147° C.

EXAMPLE 3

*Preparation of 3-bis(acetoxymethyl)amino-6-[2(5-nitro-2-furyl)vinyl]-1,2,4-triazine*

A mixture of 6 g. of 3-bis(acetoxymethyl)amino-5-[2-(5-nitro-2-furyl)vinyl]-1,2,4-triazine and 15 ml. of acetic anhydride is warmed at 50° C. with stirring for 4 hours, thereby the crystalline material is gradually dissolved to make a clear solution. This solution is allowed to stand overnight to separate a large amount of a crystalline material and then the mixture is diluted with water. The crystalline material is recovered by filtration and washed thoroughly with water to give 6.6 g. of the crude yellowish brown crystalline material, which is then recrystallized from 50 ml. of toluene to yield 5 g. of the desired product as yellow fine needles melting at 146–148° C.

EXAMPLE 4

*Preparation of 3-bis(acetoxymethyl)amino-6-[2-(5-nitro-2-furyl)vinyl]-1,2,4-triazine*

To a mixture of 6 g. of 3-bis(hydroxymethyl)amino-6-[2-(5-nitro-2-furyl)vinyl]-1,2,4-triazine and 20 ml. of pyridine was slowly added dropwise under ice-cooling 4.8 g. of acetyl chloride. The mixture is stirred for additional 2 hours. After completion of the reaction, the reaction mixture is diluted with water to separate the crude yellowish brown crystalline material, which is then recrystallized from toluene to yield 4.3 g. of the desired product as yellow fine needles melting at 146–148° C.

EXAMPLE 5

*Preparation of 3-bis(acetoxymethyl)amino-6-[2-(5-nitro-2-furyl)vinyl]-1,2,4-triazine*

Into a mixture of 6 g. of 3-bis(hydroxymethyl)amino-6-[2-(5-nitro-2-furyl)vinyl]-1,2,4-triazine, 1 ml. of pyridine and 40 ml. of benzene is slowly introduced gaseous ketene with stirring at room temperature. After saturated with ketene, the mixture is warmed to 40° C. After completion of the reaction, the reaction mixture is once filtered to remove insoluble substances, the benzene layer is separated and washed thoroughly with water followed by addition of n-hexane to yield 5.4 g. of the desired product as yellow crystals melting at 145–147° C.

EXAMPLE 6

*Preparation of 3-bis(propionyloxymethyl)amino-6-[2-(5-nitro-2-furyl)vinyl]-1,2,4-triazine*

To a suspension of 4 g. of 3-bis(hydroxymethyl)amino-6-[2-(5-nitro-2-furyl)vinyl]-1,2,4-triazine in 20 ml. of pyridine is slowly added dropwise with stirring 3.8 g. of propionyl chloride under ice-cooling, thereby the exothermic reaction takes place and a dark red clear solution forms and in a little while a crystalline slurry starts to separate so that the solution becomes sticky. The sticky solution is maintained at room temperature for 2 hours and then warmed to 45° C. After completion of the reaction, the reaction mixture is diluted with water and filtered to give yellowish brown crystalline material, which is dissolved in 25 ml. of hot benzene, the benzene solution is filtered, followed by the portion-wise addition of n-hexane to the filtrate to yield 1.4 g. of the desired product as yellow fine needles melting at 115–118.5° C.

EXAMPLE 7

*Preparation of 3-bis(propionyloxymethyl)amino-6-[2-(5-nitro-2-furyl)vinyl]-1,2,4-triazine*

The same procedure as in Example 6 is repeated except that 7 g. of propionic anhydride is employed instead of propionyl chloride and the reaction is carried out at 30–40° C. for 5 hours, thereby 4.1 g. of the crude yellow crystalline material is obtained. The material is recrystallized from a mixture of benzene and n-hexane to give 3.2 g. of the desired product as yellow needles melting at 117–118° C.

EXAMPLE 8

*Preparation of 3-bis(butyryloxymethyl)amino-6-[2-(5-nitro-2-furyl)vinyl]-1,2,4-triazine*

To a suspension of 4 g. of 3-bis(hydroxymethyl)amino-6-[2-(5-nitro-2-furyl)vinyl]-1,2,4-triazine in 20 ml. of pyridine is slowly added with stirring 4.4 g. of butyryl chloride under ice-cooling, thereby the exothermic reaction takes place and a dark red clear solution forms and in a little while a crystalline slurry starts to separate so that the solution becomes sticky. The sticky solution is maintained at room temperature for 3 hours and thereafter warmed to 45° C. After completion of the reaction, the reaction mixture is diluted with water to yield the crude crystalline material, which is dissolved in 35 ml. of hot benzene, the benzene solution is filtered, followed by the portion-wise addition of n-hexane to the filtrate to yield 2.8 g. of the desired product as yellow fine needles melting at 125–130° C.

We claim:
1. A compound of the formula

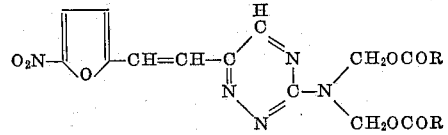

wherein R represents alkyl of 1 to 5 carbon atoms.

2. 3 - bis(acetyloxymethyl)amino - 6 - [2 - (5 - nitro-2-furyl)vinyl]-1,2,4-triazine.

3. 3 - bis(propionyloxymethyl)amino - 6 - [2-(5-nitro-2-furyl)vinyl]-1,2,4-triazine.

4. 3 - bis(butyryloxymethyl)amino - 6 - [2 - (5 - nitro-2-furyl)vinyl]-1,2,4-triazine.

References Cited

UNITED STATES PATENTS 2,993,877   7/1961   D'Alelio _____ 260—45.5

OTHER REFERENCES

Takai et al., J. Pharm. Soc., Japan, vol. 84, pages 9–10 and 14–15, January 1964.

JOHN D. RANDOLPH, *Primary Examiner.*